United States Patent [19]

Arvidson et al.

[11] Patent Number: 5,009,703
[45] Date of Patent: Apr. 23, 1991

[54] SILICON SMELTING PROCESS IN DIRECT CURRENT FURNACE

[75] Inventors: Arvid N. Arvidson; Vishu D. Dosaj; James B. May, all of Midland, Mich.

[73] Assignee: Dow Corning Corporation, Midland, N.J.

[21] Appl. No.: 566,911

[22] Filed: Aug. 13, 1990

[51] Int. Cl.$^5$ ............................................. C22B 4/00
[52] U.S. Cl. ............................ 75/10.36; 75/10.5; 423/350
[58] Field of Search ........................... 75/10.5, 10.36; 423/350

[56] References Cited

U.S. PATENT DOCUMENTS 3,215,522  11/1960  Kuhlmann ........................ 423/350
4,865,643  9/1989  Goins ................................. 75/10.5

Primary Examiner—Peter D. Rosenberg
Attorney, Agent, or Firm—William F. Boley

[57] ABSTRACT

The instant invention is a process for preparing silicon metal in a direct current, submerged-arc furnace. The process comprises adding a source of silicon dioxide and a source of carbon to a substantially closed furnace. Heat is provided to the furnace by striking a direct current arc between a moveable cathode and a anode functional hearth. Silicon metal is tapped from the furnace. The described process may also be used to prepare silicon metal alloys.

15 Claims, 1 Drawing Sheet

SILICON SMELTING PROCESS IN DIRECT CURRENT FURNACE

BACKGROUND OF THE INVENTION

The instant invention is a process for the carbothermic reduction of silicon dioxide to silicon metal. The process employs a substantially closed, direct current, submerged-arc furnace.

Typically, silicon is produced in an open, alternating current arc furnace by the carbothermic reduction of silicon dioxide. The overall reduction reaction can be represented as:

$$SiO_2 + 2C = Si + 2CO \qquad (1)$$

The two key intermediates essential for the production of silicon are silicon monoxide and silicon carbide. The reaction being:

$$SiO + SiC = 2Si + CO \qquad (2)$$

Silicon monoxide is produced by the reaction of silicon dioxide with carbon, silicon carbide, or silicon, according to the following reactions:

$$SiO_2 + SiC = SiO + CO + Si \qquad (3)$$

$$SiO_2 + C = SiO + CO \qquad (4)$$

$$2SiO_2 + SiC = 3SiO + CO \qquad (5)$$

$$SiO_2 + Si = 2SiO \qquad (6)$$

Silicon carbide is produced by the reaction of carbon with silicon dioxide or silicon monoxide, as shown below:

$$SiO_2 + 3C = SiC + 2CO \qquad (7)$$

$$SiO + 2C = SiC + CO \qquad (8)$$

In a typical submerged-arc furnace process a near stoichiometric mixture of carbon and silica is added to the top of the furnace. As the mixture descends in the furnace, silicon monoxide and silicon carbide are formed according to reactions (3) through (8). Production of excessive silicon monoxide that does not react with carbon or condense in the furnace results in loss of silicon. The most dominant reaction for production of silicon monoxide is by the equimolar reaction of silica with silicon carbide according to reaction (3). The silicon monoxide, formed in the cave zone of the furnace, ascends through the charge where, ideally, it is trapped by reacting with carbon to form silicon carbide according to reaction (8).

Present alternating current (AC) arc furnaces require high energy input for silicon production and are very inefficient from the standpoint of energy utilization. Only about 31 percent of the total energy input to the furnace, both in the form of electrical energy and chemical energy from the reductants, is used for reduction of silica. The remaining 69% of the energy is lost.

The present invention provides a potentially more energy efficient process for producing silicon metal. The use of a direct current (DC) power source, which is more controllable, results in a more efficient furnace, than with AC power. The substantially closed configuration of the furnace minimizes loss of input energy as silicon monoxide and carbon monoxide gases.

Enger et al., U.S. Pat. No. 3,887,359, issued June 3, 1975, describes a process for the carbothermic reduction of silicon dioxide. The process involves feeding the silicon dioxide into the furnace separate from the carbon reducing agent such as to create separate zones in the furnace for each. By-product gases from the reduction of silicon dioxide are passed through one or more zones rich in the carbon reducing agent. Enger et al. suggest the possibility of using alternating current as well as direct current for supply of energy to the process. The furnaces described were open-top furnaces.

Goins et al., U.S. Pat. No. 4,865,643, issued Sept. 12, 1989, describes a smelting process for making elemental silicon in a direct current arc furnace. The furnace configurations described by Goins et al. are open-top furnaces that employ either a hollow electrode or vent tubes within the arc-zone to remove by-product carbon monoxide and silicon monoxide gases.

Herold et al., U.S. Pat. No. 4,450,130, issued May 22, 1984, describes a process for the recovery of combustible gases in an electrometallurgy furnace. The described furnace comprises an external metal casing and an internal refractory lining in which at least one oxidized compound is reduced by means of carbon. The oxide compound and the carbon source are introduced into the furnace in the form of a divided charge which moves progressively down toward the reaction region, passing through a sintering region. The combustible gases produced in the reaction region are collected by suction, by means of a plurality of apertures provided in the external metal casing and the internal refractory lining. The apertures are located at a level corresponding to the lower portion of the divided charge before it passes into the sintering region. Herold et al. states the invention was specifically designed for entirely open furnaces, but there is nothing to prevent the invention being carried into effect in closed or semi-closed furnaces. The type of current used to heat the described furnaces is not specified.

SUMMARY OF INVENTION

The instant invention is a process for preparing silicon metal in a direct current, submerged-arc furnace. The process comprises adding a source of silicon dioxide and a source of carbon to a substantially closed furnace. Heat is provided to the furnace by striking a DC arc between a moveable cathode and a anode functional hearth. Silicon metal is tapped from the furnace.

DESCRIPTION OF DRAWINGS

Figure 1:
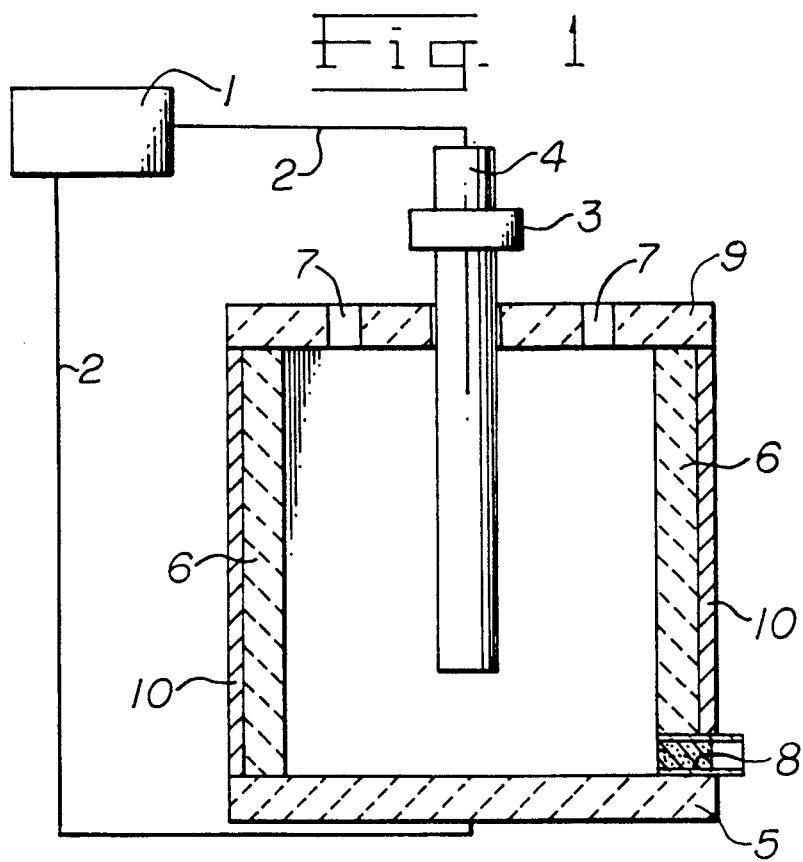
FIG. 1 is schematic representation of the basic elements of a DC arc furnace required for the presently described process.

FIG. 1 illustrates the basic elements required for a DC arc furnace used in the presently described process for the carbothermic reduction of silicon dioxide to silicon metal. The furnace employs a direct current (DC) power supply 1 connected electrically 2 to an adjustable cathode electrode 4 and an anode functional hearth 5. The cathode 4 is secured in a cathode positioning device 3, which allows vertical adjustment of the cathode 4. The cathode 4 electrode is positioned in an opening in the roof 9 of the furnace. The roof 9 also contains occludable openings 7 for the addition of feed materials, stoking of the furnace, and withdrawal of by-product gases. The furnace roof 9 is supported on the furnace wall which comprises an inner refractory surface 6 and an outer metal shell 10. Positioned within the lower portion of the furnace wall is a tapping port 8 for removing molten silicon metal from the furnace.

Figure 2:
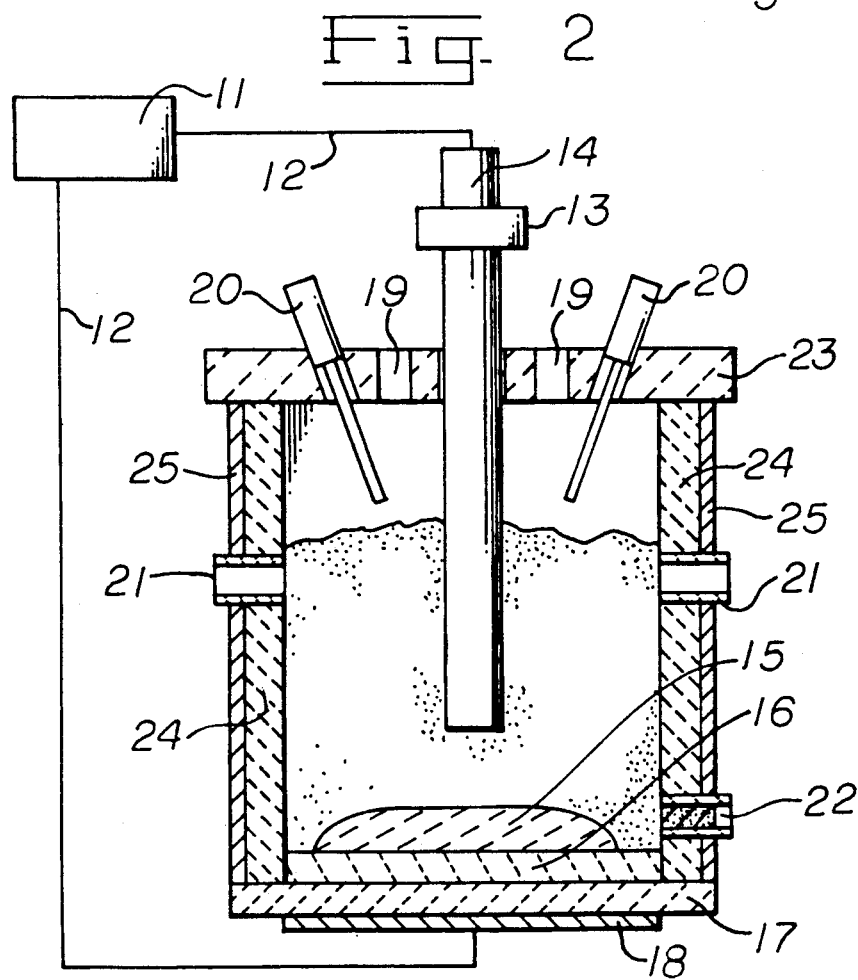
FIG. 2 is a schematic representation of the preferred configuration for a DC arc furnace required for the present described process.

FIG. 2, represents a preferred embodiment of a substantially closed DC arc furnace for use in the present claimed process for the carbothermic reduction of silicon dioxide to elemental silicon.

The furnace employs a direct current (DC) power supply 11 connected electrically 12 to an adjustable graphite electrode 14, which serves as a cathode. The graphite electrode is secured in a cathode positioning device 13. The graphite electrode 14 is positioned in an opening in the roof 23 of the furnace. The roof 23 also contains occludable openings 19, for the addition of feed materials, and stoking apparatuses 20. The furnace roof 23 is supported on the furnace wall which comprises an inner refractory surface 24 and an outer metal shell 25. Positioned within the furnace wall are vents 21, for removing by-product gases. Positioned within the lower portion of the furnace wall is a tapping port 22 for removing silicon metal from the furnace. The bottom of the furnace is a anode functional hearth consisting of a silicon carbide layer 15, a carbon layer 16, an electrically conductive refractory layer 17, and a conductive metal plate 18. The anode functional hearth is electrically connected 12 to the DC power supply 11.

DESCRIPTION OF THE INVENTION

The instant invention is a process for preparing silicon metal in a substantially closed, direct current, submerged-arc furnace. The process comprises:

(A) adding a feed mixture comprising a source of silicon dioxide and a source of carbon to a substantially closed furnace;

(B) heating the substantially closed furnace with a direct current, submerged-arc; and (C) tapping silicon metal from the substantially closed furnace.

The source of the silicon dioxide which is fed to the furnace can be, for example, quartz in its many naturally occurring forms: fused and fumed silica, precipitated silica, and silica flour, in their many forms. The form of the silicon dioxide source can be, for example, powder, granule, chip, lump, pellet, flake, and briquette.

Other additives may also be added to the furnace, for example phosphorous, as described in Dosaj et al., U.S. Pat. No. 4,898,960, issued Feb. 6, 1990, One or more alloying metals may be added to the furnace during the process, for example, calcium, copper, or iron.

The source of carbon which is loaded to the furnace can be, for example, carbon black, charcoal, coal, coke, or wood chips. The form of the carbon can be, for example, powder, granule, chip, lump, pellet, and briquette.

Theory suggests, that in order for the furnace to be in carbon balance at 100% yield, two moles of fixed carbon should be added for each mole of silicon dioxide added to the furnace. Fixed carbon is that carbon remaining after volatiles are expelled. In general, the described process can be satisfactorily run in the range of about 1.5 to 2.5 moles of fixed carbon per mole of silicon dioxide. However, in practice, it has been found preferable to run the furnace at slightly less than theoretical carbon balance to accommodate yields less than 100%. A preferred range for the mole ratio of fixed carbon to silicon dioxide is about 1.8 to 2.00. A mole ratio of fixed carbon to silicon dioxide of about 1.9 is most preferred. The carbon and silicon dioxide sources can be added to the substantially closed furnace as a continuous feed or on a batch basis.

The furnace employed in the process of the instant invention is substantially closed. By "substantially closed" is meant the furnace has a roof for containing product gases within the furnace. In addition, the substantially closed furnace contains occludable openings for adding feed materials to the furnace and for stoking the furnace. By "occludable" it is meant the openings are capable of being covered to prevent or reduce the escape of by-product gas from the furnace. In a preferred embodiment of the furnace one or more occludable ports are located in the roof of the furnace for the addition of feed materials. In addition, located in the roof, are one or more openings containing stoking apparatuses, which are incorporated as an integral part of the roof. The number, location, and orientation of feed ports and stroking apparatuses are selected to provide effective feed material placement and movement.

In a preferred embodiment, the substantially closed furnace incorporates one or more vents for removal of by-product carbon monoxide gas from the furnace. The vents may be located in the roof of the furnace or in the side wall of the furnace. Preferred, is when a plurality of vents are arranged around the body of the furnace. The vents may be located in positions ranging from above the charge level to below the charge level. The optimum number and configuration of vents in the body of the furnace will depend on the furnace size. In general, enough vents should be present to facilitate contact of by-product gases with a substantial portion of the furnace burden.

Preferred is when radially arranged vents are located slightly below the level of the furnace charge. This configuration tends to draw silicon monoxide gas toward the periphery of the furnace and facilitates contact of the silicon monoxide with carbon within the feed. Such contact facilitates reaction with the carbon resulting in capture of the silicon of the silicon monoxide as silicon carbide; thus reducing loss of silicon, as silicon monoxide, from the process. In addition, carbon monoxide and other carbon containing gases exiting the vent ports can be captured and used as a combustible energy source or as a chemical feed stock for other processes.

It is preferred that the substantially closed furnace have an internal height to diameter ratio of about 0.8 to 1.2. Furthermore, it is preferred that the internal diameter of the furnace be a function of the following equation: diameter=(100 to 150 in.)×(power to furnace (KW)/6000 KW)$^{\frac{1}{2}}$.

The substantially closed furnace is heated by a direct current, submerged-arc. By submerged is meant, the DC arc is maintained within a cavity in the body of the feed materials. The DC current is derived by rectification from a three phase alternating current source. The rectifier can be, for example, a SCR bridge rectifier.

The use of a DC arc as an energy source for the process offers numerous operational efficiencies over conventional AC arc furnaces. For example, in a typical three probe AC furnace, phase imbalance can occur which leads to different operation of each of the three electrodes. These imbalances hinder the control and efficiency of the smelting process and cause harmful electrical noise and harmonics in the power distribution system. The DC power system does not have these problems.

Furthermore, the DC system can be configured to limit current to a setpoint condition. Variability in the system can then be monitored as variation in voltage. This simplifies control of the furnace, since the current can be set and the voltage controlled to setpoint by adjusting the arc length. This fixed current method, by measuring voltage as a function of electrode distance from the hearth, allows a predictive relationship to be established between voltage and arc length. Therefore, position of the cathode within the furnace can be easily assessed. In this manner, the power can be more accurately maintained to the furnace.

Direct current also provides higher power for a given amperage because DC has no attendant power factor due to current lag. A typical three phase, AC furnace operates at about a 0.7 power factor. Therefore, at a given power input and voltage, the current in the secondary bussing would be about 1/0.7 for an AC system as compared to the current for a DC system. Direct current circuits also have a 40% higher design ampacity than AC, because DC has no skin effect.

Because a DC system can achieve the same power at a lower current, electrode consumption will be lower. This is because electrode consumption is approximately proportionate to the square of the current, therefore, the lower current results in lower electrode consumption.

A DC arc is struck between a cathode electrode inserted through the roof of the furnace and an anode functional hearth. The cathode electrode can be, for example, a graphite electrode, a carbon electrode, or a Soderberg electrode. Preferred is a graphite electrode, because the graphite electrode has a lower resistance than prebaked carbon electrodes or Soderberg electrodes. As a result of this lower resistance, a smaller electrode can be utilized for a given current carrying capability. The smaller electrode size results in less contact area with the furnace burden and hence less current flow through the bed. This results in higher furnace efficiency, because more power can be dissipated in the desired zone of the furnace.

It is desirable that the cathode electrode be adjustable in a vertical direction, since this allows adjustment of the arc length and consequently voltage of the system. The vertical adjustment of the cathode electrode is also necessary to replace electrode that is consumed. The described process may be run with a plurality of DC cathode electrodes positioned through the roof of the furnace. The number of cathode electrodes will be controlled by the size of the furnace and the power supply.

The term "anode functional hearth" refers to any configuration of the bottom of the furnace which can serve as a negative terminal to which an arc can be struck from the cathode. The configuration of the anode is not critical to the instant described process. The anode may be, for example, a conductive metal plate, such as copper, contacted with the bottom of the furnace.

In a preferred arrangement, the anode functional hearth consists of an innermost layer of silicon carbide deposited on to a carbon layer, which can be a heat cured carbon paste or carbon or graphite blocks placed on the furnace bottom electrically conductive refractory material. A copper plate is contacted with the exterior of the bottom electrically conductive refractory material to complete the hearth arrangement. The bottom electrically conductive refractory material can be, for example, a graphite-magnesite brick. In a preferred embodiment, the silicon carbide layer of the preferred configuration for the anode functional hearth is formed in situ by initially running the process with excess carbon. The excess carbon required will depend upon the size of the furnace as well as the thickness desired for the silicon carbide layer. Alternatively, preformed silicon carbide can be layered onto the furnace bottom.

Molten silicon metal is tapped from the furnace by means of a tap port located in the bottom or side wall of the furnace.

The following is offered as an example of an embodiment of the instant invention. This example is offered as an illustration of the instant invention and is not intended to limit the scope of the process described herein.

Example, A 2.5 MVA, current controlled DC arc furnace, 2.5 meters in diameter and 2.4 meters high was employed. The sidewalls of the furnace were refractory lined with 0.34 meters of magnesite brick. The bottom lining (hearth) of the furnace consisted of 0.35 meters of conductive graphite-magnesite refractory brick and 0.35 to 0.40 meters of carbon paste. A copper plate, as anode, was attached to the exterior surface of the conductive refractory brick. The furnace bottom was cooled by forced air. The roof of the furnace was cast with 0.23 meters of 90 percent alumina refractory and contained a center electrode hole, an off-gas port, an emergency relief port, and three feed doors. A 9-inch graphite electrode was utilized as the cathode. The graphite electrode was clamped in a hydraulic controlled system that provided for vertical movement of the electrode within the center electrode hole of the roof.

Power to the system was provided by stepping down incoming 27.6 kV, 3 phase AC, to 149 V, 3 phase AC, by a 2.5 MVA transformer. The stepped-down AC power source was then converted to 200 V DC (at no load) by a SCR bridge rectifier. The operating current was maintained constant by the rectifier, while the operating voltage was controlled by adjusting the position of the graphite electrode.

Materials charged to the furnace during operation consisted of lump quartz of 2–4 cm diameter obtained from L. G. Everest, Sioux Falls, S. D.; and charcoal of 1–2.5 cm diameter obtained from Rosewood, Zainesville, Ohio. The quartz and charcoal were premixed to provide mixtures of 90 and 98 percent carbon theory. A carbon theory of 100 percent is equal to two moles of fixed carbon per mole of silicon dioxide added to the furnace.

To initiate furnace operation, a 1 meter diameter and 0.60 meter high cage made of steel mesh was installed around the graphite electrode. The electrode was lowered to the bottom of the furnace and the cage filled first with a 7 cm layer of metallurgical coke and then with a 13 cm layer of crushed silicon metal. On top of this was placed 98 percent carbon theory mix to fill up the cage. Power was applied to the furnace at 150 kW and slowly increased to nearly 500 kW over 34 hours. Once an arc was established, the graphite electrode was slowly raised to a distance of about 28 cm from the bottom of the furnace. The furnace was fed with 98 percent carbon theory mixture for the first 20 hours and with 90 percent carbon theory mixture for the remainder of the run. The first silicon was tapped approximately 34 hours into the run, at which time the operation of the furnace had stabilized.

After stabilization of the furnace, power to the furnace was maintained at approximately 450 kW (50 V, 9 kA). As the roof temperature started to rise, the current was slowly reduced to 6 kA while maintaining 50 to 55 V. When an open charge top was indicated, by a sharp rise in roof temperature, the furnace was shut down and the charge raked in around the graphite electrode to cover the cavity. At the same time silicon metal was tapped from the furnace and additional charge materials added. The conditions and results for stable operation of the furnace are presented in Table 1.

TABLE 1

| Results of Stable Furnace Operation | |
|---|---|
| Average cycle length | 2.7 h |
| Charge per cycle | |
| Quartz | 123–143 kg |
| Charcoal | 60–70 kg |
| Power input | 50 V DC |
| | 9 kA start of cycle |
| | 6 kA end of cycle |
| Energy input per cycle | 750–850 kWh |
| Average tap weight | 40 kg |
| Electrode consumption | 3.2 kg/h power on |
| Power consumption | 18 kWh/kg silicon |

At completion of the run, the furnace was cooled and excavated. A dense layer of silicon carbide was evident beneath the graphite electrode. This layer provided protection of the hearth from the arc as evidenced by the unchanged nature of the underlying carbon layer.

The results demonstrate the feasibility of achieving energy efficiencies with a substantially closed, direct current, submerged-arc furnace employed for the carbothermic reduction of silicon dioxide to silicon metal. It is well known that energy efficiency is a function of furnace size, therefore, larger furnaces should produce even greater energy efficiency than that demonstrated by the furnace of the present example.

What is claimed is:

1. A process for preparation of elemental silicon, the process comprising:
   (A) adding a feed mixture comprising a source of silicon dioxide and a source of carbon to a substantially closed furnace:
   (B) heating the substantially closed furnace with a direct current, submerged-arc; and
   (C) tapping elemental silicon from the substantially closed furnace.

2. A process according to claim 1, where the feed mixture has a molar ratio of fixed carbon to silicon dioxide in a range of 1.5 to 2.5.

3. A process according to claim 1, where the feed mixture has a molar ratio of fixed carbon to silicon dioxide of about 1.8 to 2.0.

4. A process according to claim 1, where the direct current, submerged-arc is struck between a graphite cathode electrode and an anode functional hearth of the substantially closed furnace.

5. A process according to claim 4, where a silicon carbide layer is interposed between the graphite cathode electrode and the anode functional hearth.

6. A process according to claim 1, where the substantially closed furnace has at least one side wall vent.

7. A process according to claim 6, where by-product gases are collected from the side wall vent.

8. A process according to claim 7, where the by-product gas comprises carbon monoxide.

9. A process according to claim 8, where the by-product carbon monoxide is used as a chemical feedstock.

10. A process according to claim 8, where the carbon monoxide is used as a fuel.

11. A process according to claim 1, where the substantially closed furnace has an internal height to diameter ratio of about 0.8 to 1.2.

12. A process according to claim 11, where the internal diameter is $(100 \text{ to } 150 \text{ in}) \times (\text{power to furnace (KW)}/6000 \text{ KW})^{\frac{1}{2}}$.

13. A process according to claim 4, where the substantially closed furnace has a plurality of graphite electrodes.

14. A process according to claim 5, where the silicon carbide layer is formed in situ.

15. A process according to claim 1, further comprising alloying the formed silicon metal with at least one other elemental metal.

* * * * *